United States Patent
Dichtl

(10) Patent No.: US 7,870,175 B2
(45) Date of Patent: Jan. 11, 2011

(54) RANDOM NUMBER GENERATION INCLUDING SKEWNESS CONTROL

(75) Inventor: Markus Dichtl, Munich (DE)

(73) Assignee: Infineon Technologies AG (DE)

( * ) Notice: Subject to any disclaimer, the term of this patent is extended or adjusted under 35 U.S.C. 154(b) by 1163 days.

(21) Appl. No.: 11/470,100

(22) Filed: Sep. 5, 2006

(65) Prior Publication Data

US 2007/0067692 A1 Mar. 22, 2007

(30) Foreign Application Priority Data

Sep. 5, 2005 (DE) ........................ 10 2005 042 135

(51) Int. Cl.
  *G06F 1/02* (2006.01)
  *G06F 7/58* (2006.01)
(52) U.S. Cl. ........................ 708/250; 708/255
(58) Field of Classification Search .......... 708/250–256
  See application file for complete search history.

(56) References Cited

U.S. PATENT DOCUMENTS

| | | | | | |
|---|---|---|---|---|---|
| 4,355,366 | A | * | 10/1982 | Porter | 708/255 |
| 4,853,884 | A | * | 8/1989 | Brown et al. | 708/3 |
| 5,781,458 | A | * | 7/1998 | Gilley | 708/255 |
| 6,643,374 | B1 | * | 11/2003 | Wells et al. | 380/47 |
| 2007/0067375 | A1 | * | 3/2007 | Inaoka et al. | 708/250 |

OTHER PUBLICATIONS

John von Neumann; "Various Techniques Used in Connection With Random Digits"; John von Neumann Collected Works, vol. 5, Pergamon Press, 1963, pp. 768-770.

Yuval Peres; Interating von Neumann's Procedure for Extracting Random Bits; *The Annals of Statistics*, 1992, vol. 20, No. 1, pp. 590-597.

Peter Elias; "The Efficient Construction of an Unbiased Random Sequence"; *The Annals of Mathematical Statistics*; 1972, vol. 43, No. 3, pp. 865-870.

* cited by examiner

*Primary Examiner*—Chat C Do
*Assistant Examiner*—Matthew Sandifer
(74) *Attorney, Agent, or Firm*—Dickstein Shapiro LLP

(57) ABSTRACT

Random numbers can be generated in a statistically independent manner and with identical probability if the bits generated by a controlled bit generator are stored by a storage in a plurality of memory regions, wherein the bits are each stored in such memory regions associated with a difference of the bits of the values 1 and 0 generated up to the time of storage, and if all the bits stored within a memory region are subjected to algorithmic post-processing as soon as a predetermined number of bits within a memory region is exceeded. The fact that the bits are not stored and processed sequentially, i.e. in the order of generation, allows using a sequence of bits within which the individual bits are statistically independent of one another for the algorithmic post-processing. Thus, a way of performing algorithmic post-processing of the bits without reducing the entropy is provided.

14 Claims, 2 Drawing Sheets

RANDOM NUMBER GENERATION INCLUDING SKEWNESS CONTROL

CROSS-REFERENCE TO RELATED APPLICATION

This application claims priority from German Patent Application No. 10 2005 042 135.0, filed Sep. 5, 2005, and is incorporated herein by reference in its entirety.

BACKGROUND OF THE INVENTION

1. Field of the Invention

The present invention relates to generating random numbers and, in particular, to a concept for generating a quantity of statistically independent bits in which the bit values 0 and 1 occur with the same frequency.

2. Description of Prior Art

There are various applications in which random numbers have to be generated. When for example transmitting data in an encrypted manner, the keys may be generated based on random numbers. A reliable generation of random numbers is an indispensable prerequisite for safe data transmission. Implementing a random generator in a chipcard is of interest for mobile applications to enable a safe digital signature, wherein this application has gained in importance in the recent past.

Here, it is of particular importance that the frequency with which the values 0 and 1 are generated is, on average, identical for a random number generator which is to generate a sequence of random bits of the values 0 and 1. If this was not the case, it would be made easy for a potential attacker to compromise the system by utilizing, for his attack, the fact that one of the values 0 or 1 is generated more frequently. Experience has shown that physical random number generators, however, exhibit a certain deviation from the mathematical ideal case of the statistically independent random bits with a 1 and a 0 probability of ½, regardless of their operating principle. A number of random bits, for example, are frequently generated by observing a physically generated noise voltage, wherein the noise voltage is digitalized (sampled) in discrete periods of time and a bit of the value 1 will be output if a reference voltage value is exceeded at the time of sampling, whereas a bit of the value 0 will be output if the result is below the reference voltage. Often, a semiconductor pattern is used for generating the noise voltage. An addition of a constant voltage offset to the noise voltage, as is exemplarily caused by a change in temperature, obviously changes the probability with which the values 0 or 1 are generated. Deviations from the desired ideal behavior of a random number generator result in this way.

If the probability of 1 bits occurring deviates from the ideal value of ½, we talk of skewness of the random bits generated. In order to prevent this, there is a way of intervening in the source by controlling, which, for the above example, would mean adding an additional controlled offset voltage of the noise voltage. If too many ones have resulted, the parameters of the generator will be changed such that more zeros will be formed, and vice versa. Frequently, the difference between the number of 1 bits formed since the start of the generator and the 0 bits formed since the start is used as a measure of the 1 excess. (This may be achieved in an, as far as technology is concerned, easy manner by and up/down counter incrementing its value in the case of 1 bits and decrementing for 0 bits.) Depending on the count, the operating point of the generator is then shifted such that the bit value with a lack of frequency will be generated more frequently.

A problem of the skewness control just described is that statistical dependences result between the bits. Obviously, with this skewness control, the occurrence of many subsequent zeros, for example, will increase the probability of a 1-bit occurring. Here, this dependence is not only present over a few neighboring bits, but in principle over any distances and times. Such a dependence contradicts the principle of an ideal random number generator where it is the very aim to generate any number generated with always the same probability, i.e. independently of the numbers generated in the past. The random numbers generated one after the other thus are to be statistically independent.

Frequently, the deviations from the mathematical ideal case are reduced by algorithmic post-processing of the bits generated by a random bit generator. A precondition for this is that the random bits generated by the generator are statistically independent and that, additionally, the probabilities with which the values 0 or 1 are generated are constant over time, wherein these need not necessarily be exactly ½.

A statistical measure of the information content of a certain piece of information I (such as, for example, a number of random number bits) over an alphabet Z (in the case of random bits, the alphabet consists of the values 0 and 1) is the entropy H defined as follows:

$$H(I) = -\sum_{j=1}^{|Z|} pj \cdot \log_2 pj$$

Thus, pj is the probability with which the jth symbol (0 or 1) of the alphabet Z occurs in the information text I. Although the calculation of the entropy H may also be transferred to different number systems (such as, for example, octal numbering system, hexadecimal system) than the binary system, only the application of the above definition to the binary system is of importance for the following discussion. The maximum value of the entropy obtainable for a sequence of random numbers is 1, wherein the entropy H will take the value 1 precisely if the number of the values 0 and 1 in the sequence of the random bits generated (the information text) is identical.

A skewness when generating random numbers thus corresponds to an entropy smaller than 1. An increase in entropy by algorithmic post-processing procedures can only be achieved by means of compression, i.e. more than one input bit of a random number generator is required to generate a final output bit. A well-known example of algorithmic post-processing of this kind is the method by John von Neumann, which is described in the publication "Various Techniques Used In Connection With Random Digits", John von Neumann, Collected Works, Volume V, Pergamon Press, 1963. Here, a sequence of statistically independent output bits having the same probability $z_1, z_2, \ldots z_m$ is generated from an input bit sequence $x_1, x_2, \ldots x_n$. It is a precondition here that the input bits of the input bit sequence are statistically independent of one another and that the probability of the input bits $x_i$ having the value 0 or 1 is constant over time. This is to say:

$P(x_i=1)=p$, and $P(x_i=0)=q=1-p$ is true for all n. Von Neumann thus summarizes two each of the input bits $x_i$ and uses the following mapping:

(1) 00→Λ 01→0, 10 →1, 11→Λ, wherein Λ means that no output bit will be output. If the bit sequence 01 is generated, a 0 will be output by the Von Neumann mapping, if the bit sequence 10 is generated, a 1 will be output, wherein both cases each occur with the same probability pq. Using the above assumptions for the input bits $x_i$, a bit sequence of statistically independent bits is generated by the algorithmic post-processing suggested by Von Neumann, wherein the different bit valencies occur with the same constant probability of ½.

Further procedures based on the principle of increasing the entropy by compression are described in "Iterating Von Neumann's Procedure For Extracting Random Bits" by Yuval Peres, The Annals of Statistics, 1992, Vol. 20, No. 1, 590-597, and in "The Efficient Construction of an Unbiased Random Sequence" by Peter Elias, The Annals of Mathematical Statistics, 1972, Vol. 43, No. 3, 65-870. A widely used form of compression is XOR operating several input bits to form one output bit.

There is also demand for algorithmic post-processing of the bits generated for random number generators where skewness is eliminated by means of control. Here, it may be an aim of such a post-processing to eliminate or reduce the dependences caused by the control, wherein no post-processing functions achieving this aim are known from the prior art. It is generally required for an algorithmic post-processing of a random number source comprising skewness correction by means of control that the entropy must not be reduced by the algorithmic post-processing. At present, there is no proof that the post-processing methods known so far do not reduce entropy, wherein in particular the difficulties are that the dependences occur over any period of time and that the probabilities corresponding to the individual counts are not known.

In general, the problem with a combination of a random number generator based on skewness control and algorithmic post-processing is that statistical dependences between the bits generated are caused by the skewness control, wherein a precondition for applying a post-processing algorithm, however, is statistical independence of the input bits and a temporally constant probability of generating the values 0 and 1. While the requirement for time stability of the generation probability can be met by the control, this control, however, provides an undesired statistical dependence between the bits provided as input bits for the algorithmic post-processing.

SUMMARY OF THE INVENTION

It is an object of the present invention to provide a concept of generating a sequence of statistically independent bits, wherein the values 0 and 1 the bits may take are generated with equal probability.

In accordance with a first aspect, the present invention provides a device for generating random numbers, having: bit-generating means for generating bits formed to generate a bit of a value 0 or 1 with a probability depending on a control quantity; counting means for determining the difference of the number of bits of values 0 and 1 generated, wherein the counting means is formed to determine a difference value for bits output by the bit-generating means; memory means having a plurality of memory regions, wherein each memory region is associated with a difference value, wherein the memory means is formed to store a bit output by the bit-generating means in the memory region associated with the difference value; and readout means for reading out the bits from a memory region if a predetermined number of bits is stored in the one of the memory regions.

In accordance with a second aspect, the present invention provides a method for generating random numbers, having: generating bits of a value 0 or 1, wherein the probability of generating the value 0 or 1 depends on a control quantity; determining the difference of the number of the bits of the values 0 and 1 generated; storing a bit generated in a memory region of a plurality of memory regions of memory means in which each memory region is associated with a difference value, wherein the bit is stored in the memory region associated with the difference value; and reading out the bits from the memory region if a predetermined number of bits is stored in the one of the memory regions.

In accordance with a third aspect, the present invention provides a computer program having a program code for performing the above method, when the program runs on a computer.

The present invention is based on the finding that random numbers can be generated with identical probabilities in a statistically independent manner if the bits generated by controlled bit generation means are stored by memory means in a plurality of memory regions, wherein the bits are stored in such memory regions associated with a difference of the number of bits of the values 1 and 0 generated up to the point of storage, and if all the bits stored within a memory region are subjected to algorithmic post-processing if a predetermined number of bits within a storage region is exceeded.

The fact that the bits are not stored and processed sequentially, i.e. in the order of generation, allows using a quantity of bits for the algorithmic post-processing within which the individual bits are statistically independent of one another and which have additionally been generated with constant probability. Thus, a way of performing algorithmic post-processing of the bits is provided without reducing entropy.

According to a preferred embodiment of the present invention, the resulting bits are stored separately for every value of the difference between the numbers of 1 and 0 bits generated so far. Thus, a buffer is associated with every difference possible, wherein each buffer can store a plurality of bits and has a fixed length.

Exemplarily, it is assumed that a physical random number generator or physical bit generation means has already generated 921 1 bits and 911 0 bits, i.e. the difference between 1 and 0 bits is 10.

Another bit generated is added to the buffer memory for the difference 10. If the new bit generated was a 1, the difference will increase to 11, a next bit generated would consequently be stored in the buffer memory associated with the difference 11. If the bit generated at the difference 10 was a 0, the next bit will be stored in the buffer for the difference 9.

Post-processing of the bits stored within a buffer will only take place if the buffer contains a predetermined number of bits. Here, it is essential that only those bits read out from a single buffer memory are combined to one another by algorithmic post-processing. The bits obtained as a result of post-processing the bits of the buffer memory will then be output as random numbers. Subsequently, the buffer memory is emptied. As soon as another buffer memory contains the maximum number of bits, the bits contained therein are subjected to the post-processing function and the result will again be output.

Due to the fact that the bits collected in the individual buffer memories are statistically independent with a suitable design of the bit-generating means, since they have been stored in the buffer memories at completely different points in time (defined by the differences), the result is the possibility of continuing to process statistically independent bits within a buffer memory which may comprise skewness in an algorithmic manner by means of well-known methods, such as, for example, XOR, Von Neumann or Elias in an algorithmic manner.

Statistically independent bits which may be processed by well-known methods for correcting skewness are the result of separate storage of the bits formed with a difference. It can easily be shown by the statistical independence of the bits from a buffer that post-processing does not reduce entropy. This beneficially allows using a noise source requiring control due to its physical features to generate sets of statistically independent bits by minimally more complex hardware. Controlling the noise source guarantees fulfilling constant generation probability. For the first time, the precondition of algorithmic post-processing maintaining the entropy is provided by the proven statistical independence of the bits generated to eliminate any remaining skewness of the bits and thus provide a random number generator corresponding to the mathematical ideal case.

In another embodiment of the present invention, the number of buffer memories is reduced so that a smaller number of buffer memories are available than would be required for covering all possible differences between 1 and 0 values occurring. Here, it is, in particular, possible to dynamically associate the buffers or buffer memories to a certain difference. If the association of a buffer to a difference has to be changed, the bits already present in the buffer will have to be discarded. A dynamic buffer-to-difference association will particularly be practical if only a few buffers are used. Then, it cannot be guaranteed by the control that the difference 0 is the most frequent one. However, by means of a dynamic association it can be achieved that buffer memories are available for the most frequent differences.

Since the number of buffer memories is irrelevant for the mode of functioning of the inventive concept, i.e. statistically independent bit quantities can also be generated by a smaller number of buffer memories, it is possible in a beneficial manner to further reduce the hardware complexity required.

In another embodiment of the present invention, the bits read out from a memory region are examined as to skewness before being post-processed algorithmically. If there is no skewness, i.e. if the bits with the values 0 and 1 are equally distributed within the bit sequence, the bits will be output as random numbers without further algorithmic processing. This saves calculating time and current consumption which would arise when further processing the bits read out algorithmically. In addition, the compression, i.e. reducing the number of bits generated, may be omitted for bit quantities having an even distribution so that the rate by which the random numbers are output by the inventive device for generating random numbers is increased.

BRIEF DESCRIPTION OF THE DRAWINGS

Preferred embodiments of the present invention will be detailed subsequently referring to the appended drawings, in which.

DESCRIPTION OF PREFERRED
EMBODIMENTS

Figure 1:
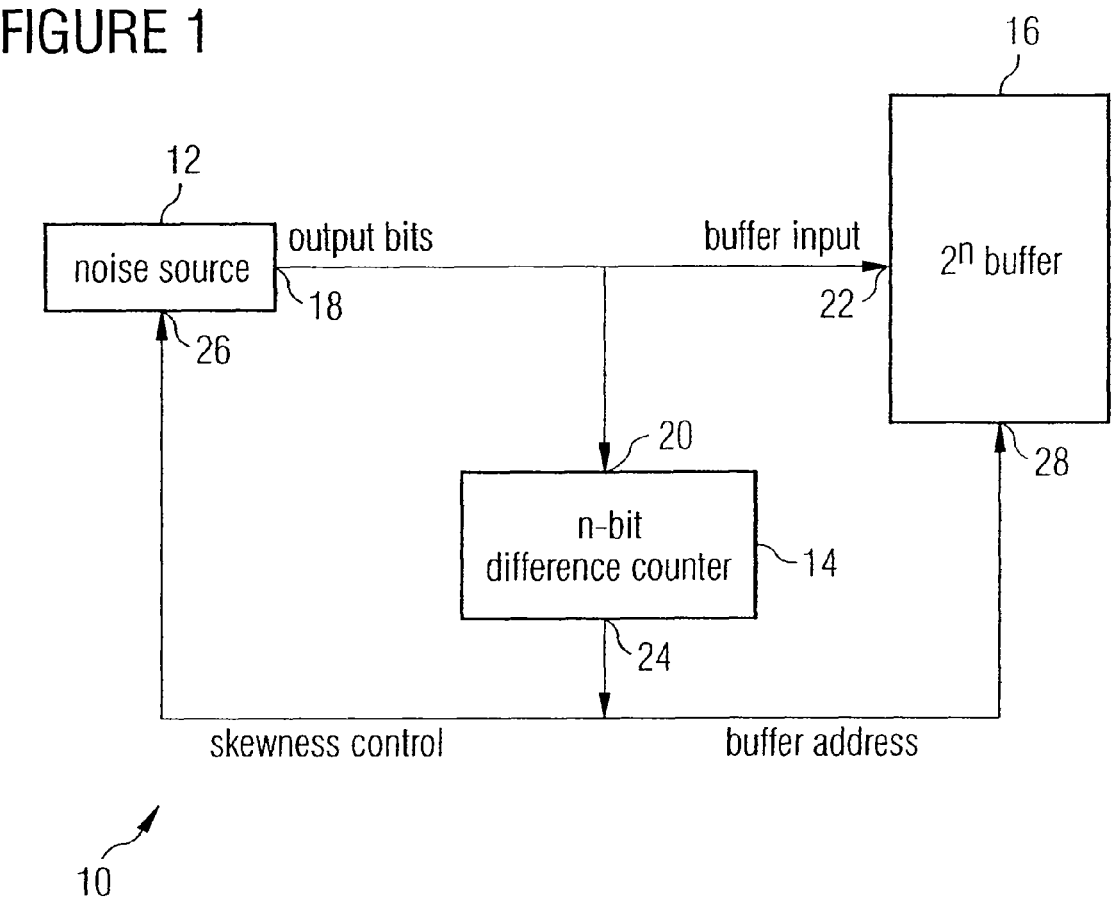
FIG. 1 shows an inventive device for generating random numbers.

FIG. 1 shows a block circuit diagram by means of which the mode of functioning of the inventive device for generating random numbers is explained.

The device for generating random numbers 10 here includes bit-generating means 12, counting means 14 and memory means 16.

The noise source 12 generates random bits which may, for example, be based on the analysis of a noise voltage according to well-known principles. The random bits are transmitted via a data output 18 of noise source 12 to both a data input 20 of the counting means 14 and to a data input 22 of the memory means 16. The counting means is embodied as an n-bit difference counter, i.e. it increments the count when a 1 arrives and decrements the count when a 0 arrives. The count of the counting means 14 thus indicates at any point in time the difference of the number of the values 1 and 0 generated up to the observed point in time, wherein in principle $2^n$ different difference values may be represented. The difference value output at the data output 24 of the counting means is applied to a control input 26 of the bit-generating means 12 on the one hand and to an address input 28 of the memory means 16 on the other hand.

On the one hand, the difference serves for controlling a control quantity of the bit-generating means 12 to implement skewness control. If one of the values 0 or 1 occurs too frequently, the noise source or bit-generating means 12 thus will be controlled such that the, in the past, underrepresented value will be generated more frequently in future.

On the other hand, there is a plurality of memory regions or buffers in the memory means 16 according to the invention, wherein each memory region is addressed via a memory address associated with a difference value. The difference value at the data output 24 of the counting means 14 is thus employed to select, via the address input 28 of the memory means, a memory region where the bit at the data input 22 of the memory means 16 is stored.

Since in the case shown the counting means 14 is an n-bit difference counter, i.e. all in all $2^n$ difference values are generated, the memory means 16 includes $2^n$ different memory regions which may be addressed individually.

The device for generating random numbers 10 illustrated in FIG. 1 thus allows realizing the inventive concept which serves to obtain, in the memory regions of the memory means 16, bit sequences which are statistically independent and comprise a constant probability of generating the values 0 or 1. Due to statistical fluctuations, the bit sequences stored in the individual memory regions of the memory means 16 may still have some skewness which may inventively be corrected without a loss in entropy, as will be described briefly below referring to FIG. 2.

Figure 2:
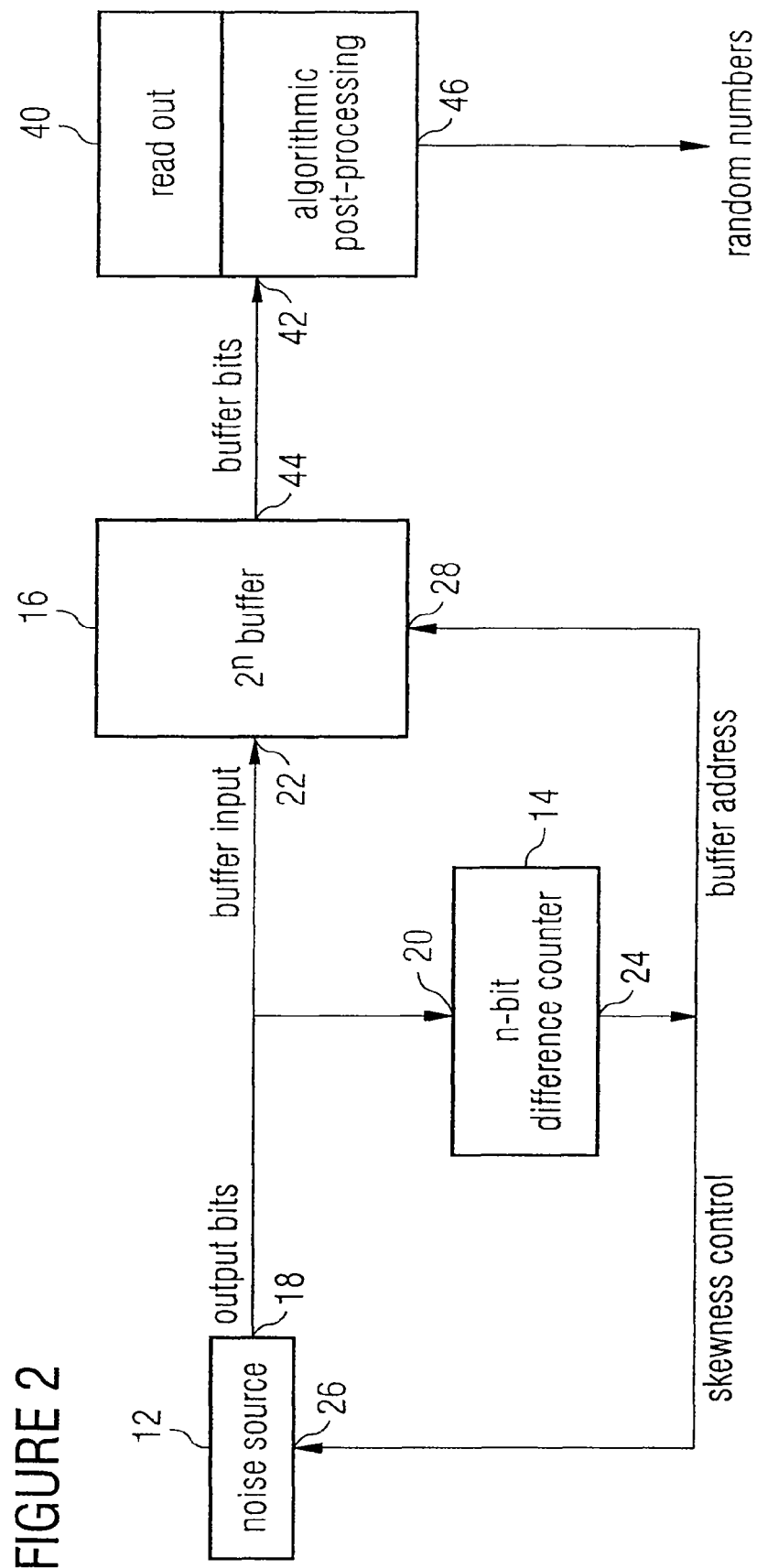
FIG. 2 shows a device for generating random numbers including algorithmic post-processing.

FIG. 2 basically represents an extension of the embodiment of FIG. 1. Parts of the inventive device for generating random numbers having the same function as in FIG. 1 are provided with same reference numerals, a repeated description of their functions being omitted.

The device for generating random numbers, as is shown in FIG. 2, additionally comprises readout means 40.

A data input 42 of the readout means 40 is connected to a data output 44 of the memory means so that the readout means 40 can read out the bits stored within a memory region of the memory means 14. Inventively, a memory region within the memory means will be read out by the readout means 40 if a predetermined number of bits within the memory region is exceeded by adding a bit, put differently if the buffer memory is full. The buffer memory is emptied after the readout process and after that no more bits having been generated by the bit-generating means 12 are stored within the memory region.

The readout means 40 further includes means for algorithmically post-processing the bits read out to correct any skewness in the bits read out by well-known methods. The random numbers having been generated from the bits read out by algorithmic post-processing are provided at the random number output 46 of the readout means 40, wherein the random numbers provided at the random number output 46 are both statistically independent and distributed evenly, and wherein it is additionally ensured by the inventive device for generating random numbers that the entropy of the random numbers is not reduced by the algorithmic post-processing.

Although in the embodiments of the present invention shown above, the memory means comprises a number of buffers or buffer memories corresponding to the number of differences of the counting means which may be represented, it is alternatively also possible to provide a smaller number of buffer memories. Preferably, the buffer memories are dynamically associated with certain differences such that the most frequently occurring differences are associated with a buffer memory. The efficiency, i.e. the rate by which the random numbers are generated, is optimized by this. The complexity of a hardware implementation may thus be reduced, which is of particular advantage in relation to current consumption and area consumption of an implementation in the mobile sector.

In the embodiments described above, a representation of $2^n$ different differences and buffers, i.e. of a finite number thereof, is described. In principle, it is also possible for the difference of the numbers of 1 and 0 bits to be arbitrarily great, even if very large differences are extremely improbable due to the skewness control. Buffers for differences having a very high absolute value thus need not be created. If a difference having a very high absolute value should occur for which there is no buffer, the bit formed will not be stored. However, the bit is used for calculating the difference to ensure the mode of functioning of the skewness control. The number of buffers may thus also be established by a trade off between the memory requirement for the buffers and the expected output rate of the generator. Since the mode of functioning of the inventive device for generating random numbers does not depend on the number of buffers available, there is great freedom when implementing the concept in this respect.

Algorithmic post-processing of the statistically independent data bits generated may in an alternative embodiment of the present invention be omitted whenever the bits of a memory region read out from the memory means 16 do not exhibit skewness, which is how current on the one hand and processing time on the other hand are saved. In addition, the output rate of the device for generating random numbers is increased since compression, i.e. combining several bits to form one bit output, may be omitted.

XOR operation, the methods according to von Neumann, Elias and Peres are examples of methods of algorithmic post-processing. However, any other algorithmic post-processing methods serving to eliminate skewness might be used.

In the embodiments described, a controlled noise voltage source is used to generate the bits. However, any other bit-generating means able to generate bits of the values 0 and 1 with certain probabilities is suitable for putting the inventive concept into practice.

In the embodiments described, the difference value of the bits of the values 1 and 0 generated, which is calculated by an n-bit difference counter, is used for controlling the bit-generating means. The difference value may thus be obtained in any other manner, for example by using two separate counters for the bit values 0 and 1 generated.

Depending on the circumstances, the inventive method of generating random numbers may be implemented in either hardware or software. The implementation may be on a digital storage medium, in particular on a disc or a CD having control signals which may be read out electronically which can cooperate with a programmable computer system such that the inventive method for generating random numbers will be executed. Generally, the invention thus also is in a computer program product having a program code stored on a machine-readable carrier for performing the inventive method when the computer program product runs on a computer. Put differently, the invention thus may also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for generating random numbers, comprising:
a bit generator formed to generate a sequence of bits having a value of 0 or 1 at a probability depending on a control quantity;
a counter formed to determine, for each currently generated bit output by the bit generator, a difference in the number of bits in the sequence having values 0 and 1 generated up to the currently generated bit;
a storage having a plurality of memory regions, wherein each memory region is addressed by a different difference value output by the counter, wherein the storage is formed to store each currently generated bit output by the bit generator in the memory region addressed by the difference value output by the counter, wherein the difference value indicates the difference determined up to the currently generated bit; and
a reader formed to read out the bits from a memory region if a predetermined number of bits is stored in the one of the memory regions.

2. The device according to claim 1, wherein the counter is additionally formed to change the control quantity of the bit generator depending on the difference value.

3. The device according to claim 2, wherein the counter is formed to change the control quantity such that if a difference value indicates a more frequent occurrence of one of the values 0 or 1, a probability with which the more frequent value is generated by the bit generator will be reduced.

4. The device according to claim 3, wherein the reader is formed to deduce the random numbers by applying an association rule to the bits read out.

5. The device according to claim 4, wherein the association rule is applied such that the values 0 and 1 are evenly distributed in the random numbers provided.

6. The device according to claim 4, wherein the reader is formed such that applying the association rule includes combining at least two bits read out to form a random number.

7. The device according to claim 1, wherein the reader is additionally formed to check an even distribution of the values 0 and 1 in the bits read out from the memory region to deduce the random numbers depending on the check result.

8. The device according to claim 7, wherein the reader is formed to provide the bits read out as random numbers if the even distribution check indicates an even distribution of the values 0 and 1 in the bits read out.

9. The device according to claim 1, wherein the reader is formed to read out the bits from the memory region associated with a current difference value.

10. A method for generating random numbers, comprising:
generating a sequence of bits having a value 0 or 1 at a probability depending on a control quantity;

determining, for each currently generated bit output by the bit generator, a difference in the number of bits in the sequence having values 0 and 1 generated up to the currently generated bit;

storing each currently generated bit in a memory region of a plurality of memory regions of a storage in which each memory region is addressed by a different difference value, wherein the currently generated bit is stored in the memory region addressed by the difference value, wherein the difference value indicates the difference determined up to the currently generated bit; and reading out the bits from the memory region if a predetermined number of bits is stored in the one of the memory regions.

11. A computer-readable non-transitory digital storage medium having stored thereon a program having a program code for performing a method for generating random numbers, comprising:

generating a sequence of bits having a value 0 or 1 at a probability depending on a control quantity;

determining, for each currently generated bit output by the bit generator, a difference in the number of the bits in the sequence having values 0 and 1 generated up to the currently generated bit;

storing each currently generated bit in a memory region of a plurality of memory regions of a storage in which each memory region is addressed by a different difference value, wherein the currently generated bit is stored in the memory region addressed by the difference value, wherein the difference value indicates the difference determined up to the currently generated bit; and reading out the bits from the memory region if a predetermined number of bits is stored in the one of the memory regions, when the program runs on a computer.

12. A device for generating random numbers, comprising:

a bit generator formed to generate bits among which a sequential order is defined, and each of which has a value 0 or 1 at a probability depending on a control quantity;

a counter formed to determine, for each currently generated bit in the sequence output by the bit generator, the difference in the number of bits in the sequence having values 0 and 1 generated up to the currently generated bit, and to determine a difference value for the currently generated bit output by the bit generator; and a storage having a plurality of memory regions, wherein each memory region is addressed by a different difference value output by the counter, wherein the storage is formed to store each currently generated bit output by the bit generator in the memory region addressed by the difference value output by the counter, wherein the difference value indicates the difference determined up to the currently generated bit.

13. A method for generating random numbers, comprising:

generating bits among which a sequential order is defined, and each of which has a value 0 or 1 at a probability depending on a control quantity;

determining, for each currently generated bit output by the bit generator, the difference in the number of the bits in the sequence having values 0 and 1 generated up to the currently generated bit; and storing each currently generated bit in a memory region of a plurality of memory regions of a storage in which each memory region is addressed by a different difference value, wherein the currently generated bit is stored in the memory region addressed by the difference value, wherein the difference value indicates the difference determined up to the currently generated bit.

14. A computer-readable non-transitory digital storage medium having stored thereon a program having a program code for performing a method for generating random numbers, comprising:

generating bits among which a sequential order is defined, and each of which has a value 0 or 1 at a probability depending on a control quantity;

determining, for each currently generated bit output by the bit generator, the difference in the number of bits in the sequence having values 0 and 1 generated up to the currently generated bit; and storing each currently generated bit in a memory region of a plurality of memory regions of a storage in which each memory region is addressed by a different difference value, wherein the currently generated bit is stored in the memory region addressed by the difference value, wherein the difference value indicates the difference determined up to the currently generated bit, when the program runs on a computer.

* * * * *